July 8, 1969   L. M. PETERSON   3,453,925
PIVOTAL LOCKING DEVICE
Filed Jan. 12, 1968
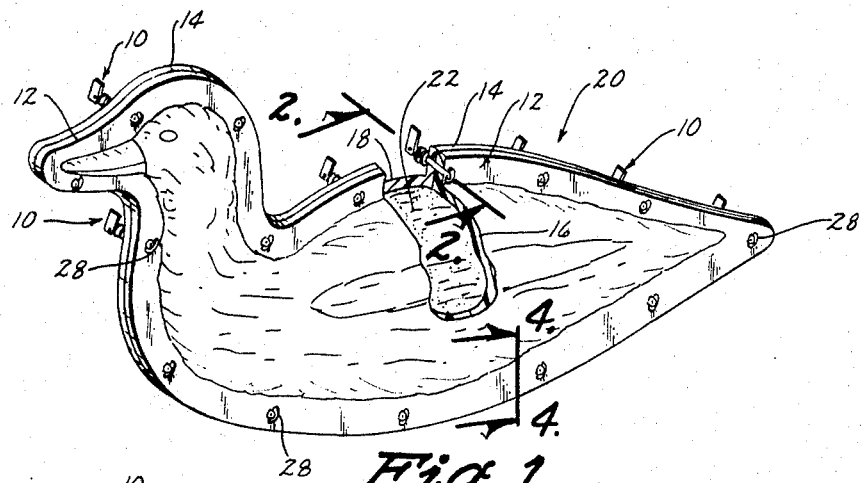
Fig. 1
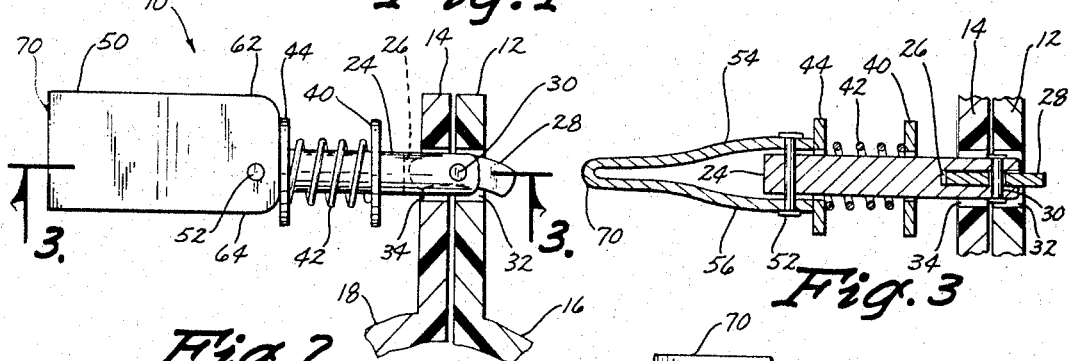
Fig. 2
Fig. 3
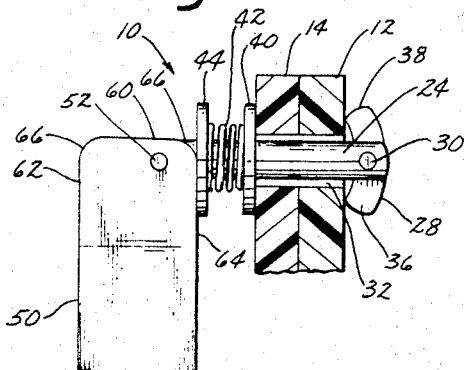
Fig. 4
Fig. 5
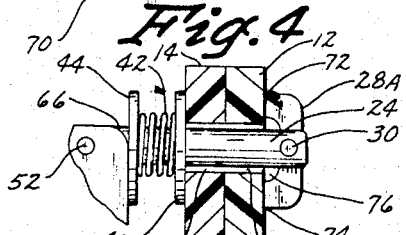
Fig. 6
INVENTOR
LESLIE M. PETERSON
BY
Dick, Zarley, McKee & Thomte
ATTORNEYS 3,453,925
PIVOTAL LOCKING DEVICE
Leslie M. Peterson, 41 23rd St. SW.,
Mason City, Iowa 50401
Filed Jan. 12, 1968, Ser. No. 697,413
Int. Cl. F16b 35/04, 21/14
U.S. Cl. 85—3                                    7 Claims

ABSTRACT OF THE DISCLOSURE

A device having a pin with a pivotal locking element on one end thereof and a locking lever on the opposite end selectively engaging a cam bearing plate element which engages a coil spring bearing on a clamping element opposite the locking pin. The locking lever has an end and opposite side engaging surfaces and a pivotal axis off center between the side engaging surfaces such that the lever may be pivoted to any of three positions and in each position the lever engages the cam bearing plate element which causes different amounts of displacement of the clamping element.

---

The molding of life-like figures for display in front of residential homes or the like requires the use of many fasteners for interconnecting the mold parts. Most molds have four or more mold parts. Each mold part has a connecting flange which may vary in thickness along its peripheral edge. The conventional practice is to use an ordinary bolt and nut in connecting together adjacent flanges but the assembling and disassembling of the mold is very time consuming and difficult because threaded fasteners become inoperative when concrete or the like fills the threads.

The fastener of this invention makes it possible to quickly assemble and disassemble the mold for life-like figurines and other articles. The clamping device is capable of varying the pressure on the mold parts being clamped so that the mold parts may be initially assembled and loosely locked together by moving the locking lever to one position and then later tightly clamped together by moving the locking lever to one of two other positions depending on the thickness of the flanges. When the locking lever is in the first position a minimum of pressure is applied to the mold parts and the fastener may be easily removed.

Further, the fastener of this device includes a locking element which has engaging surfaces spaced outwardly from the center locking pin such that the peripheral area around the hole through which the pin extends is not enlarged through wear. This wear is further distributed in one embodiment by a pair of parallel bearing surfaces being provided on the locking pin for engaging parallel surfaces on the plates being clamped.

These and other features and advantages of this invention will become readily apparent to those skilled in the art upon reference to the following description when taken into consideration with the accompanying drawings, wherein:

FIG. 1 is a fragmentary perspective view of an assembled mold employing the fasteners of this invention;

FIG. 2 is a fragmentary side elevation view of the fastener being inserted into the aligned openings of the mold parts with the locking lever in its initial position;

FIG. 3 is a cross-sectional view taken along line 3—3;

FIG. 4 is a view similar to FIG. 2 but showing the fastener with the locking lever in another position clamping the flanges of the mold parts together;

FIG. 5 is a view similar to FIG. 4 but showing the fastener securing together thinner flanges and the locking lever in still another position to compensate for the difference in flange thickness; and FIG. 6 is a fragmentary perspective view similar to FIG. 4 but showing an alternate locking element in the fastener.

The fastener of this invention is referred to generally in FIG. 1 by the reference numeral 10 and is shown interconnecting the flanges 12 and 14 of mold parts 16 and 18 in a life-like duck mold 20 filled with concrete 22.

The fastener 10 includes a cylindrical in cross-section pin 24 having an elongated longitudinal extending slot 26 in one end thereof in which a locking element 28 is pivotally connected by a pivot pin 30. The locking element 28 is approximately the width of the pin 26 and thus when moved to the position shown in FIGS. 2 and 3 it extends longitudinally of the pin 24 and is adapted to pass through openings 32 and 34 in the mold flanges 12 and 14. Upon the pin 24 being inserted completely through the flanges 12 and 14 the locking element 28 is pivoted to a position perpendicular to the longitudinal axis of the pin 24 and thus the outer ends 36 and 38 of the locking element 28 engage the adjacent flange 12 outwardly of the aperture 32. It is seen that this engagement is a substantial distance outwardly of the aperture 32 and in the embodiment of FIGS. 2–5 the engagement is along a line defined by the width of the locking element 28. Frictional wear of the flange 12 closely adjacent the aperture 32 is prevented by the outwardly engaging ends 36 and 38 of the locking element 28.

The pin 24 carries a clamping washer 40 for engagement with the mold flange 14 and is held tightly thereagainst by the coil spring 42 embracing the pin 24. The outer end of the coil spring 42 is engaged by a cam bearing washer plate element 44.

A locking hand operated lever 50 is pivotally connected to the end of the pin 24 by a pivotal pin 52. The locking lever 50 includes a pair of legs 54 and 56 which straddle the pin 24. Each of the legs have an end and opposite side engaging surfaces 60, 62, 64 respectively. The end and side surfaces are interconnected by a rounded convex edge 66. It is seen that the distance between the pivotal axis through the pivotal pin 52 and the side edge 64 is considerably less than the distance to the opposite side edge 62. Moreover, the distance between the pivotal axis and the end edge 60 is even less.

Thus in operation, the locking lever 50 is arranged in the position shown in FIGS. 2 and 3 wherein the end edges 60 engage the element 44 and place the minimum amount of pressure on the washer 40 for clamping the flanges 12 and 14 together. After all of the fasteners 10 have been inserted into the flanges around the periphery of the mold in FIG. 1 the levers are then pivoted 90 degrees to either of the positions shown in FIGS. 4 or 5 wherein the maximum amount of pressure is exerted on the flanges 12 and 14 and the spring 42 is compressed the maximum amount.

It is seen that the legs 54 and 56 are formed from a single sheet of metal and converge inwardly at their outer end to form a handle 70 for operating the locking lever 50.

In FIG. 6 an alternate embodiment is shown wherein the locking element 28A has an outer end surfaces 72 and 74 which are parallel and in a common plane and are parallel to the adjacent flat surface of the flange 12 and thus distribute the wear over a substantial area outwardly of the aperture 32 in the flange 12. It is further seen that the element 28A is dished out at 76 over the aperture 32 when viewed in FIG. 6 similar to the concave shape of the element 28 in FIGS. 2–5.

Accordingly, it is seen that the fastener of this invention may be quickly attached and detached from the mold 20 of FIG. 1 by following the procedure set forth hereinabove.

Some changes may be made in the construction and arrangement of my fastener device without departing from the real spirit and purpose of my invention.

I claim:
1. A fastener device, comprising,
   a pin having a pivotal locking element at one end and an oppositely disposed clamping element spaced from said locking element on said pin,
   a spring means on said pin engaging at one end of said clamping element,
   a bearing plate element on said pin engaging the other end of said spring means,
   a locking lever pivotally connected to said pin outwardly of said cam bearing plate element for selectively moving said bearing plate element, spring means and clamping element into clamping engagement with material adapted to be positioned between said locking element and said clampaing element, and
   said locking lever having an end and opposite side engaging surfaces, said lever having its pivotal axis off center between said side engaging surfaces whereby when said lever is pivoted to a first position with one side engaging surface engaging said cam bearing plate element, said end engaging surface being spaced closer to said pivotal axis than either of said engaging surfaces, and the displacement of said clamping element being different than when said lever is pivoted to a second position with said other side engaging surface engaging said cam bearing plate element.
2. The structure of claim 1 wherein said locking element is movable between first and second positions, in said first position said locking element is disposed in substantial parallel relationship with said pin, and in said second position said locking element is extending transversely of said pin with its outer ends being disposed substantially outwardly of the adjacent side of said pin, said locking element has bearing surfaces at its opposite ends facing said cam bearing plate element when in said second position and said bearing surfaces being substantially spaced from said pin on opposite sides thereof.
3. The structure of claim 1 wherein said side engaging surfaces are substantially parallel and perpendicular to said end engaging surface.
4. The structure of claim 1 wherein said locking lever includes a pair of legs which straddle said pin and each have said end and opposite side engaging surfaces.
5. The structure of claim 4 wherein adjacent end and side engaging surfaces are interconnected by a rounded convex corner shoulder and said lever is adapted to pivot through 180 degrees between said first and second positions with said lever being at a 90 degree third position when said end engaging suface engages said cam bearing plate element.
6. The structure of claim 5 wherein said legs have outer ends converging together to form a handle portion.
7. The structure of claim 6 wherein said bearing surfaces are parallel and perpendicular to the longitudinal axis of said pin when said locking element is in said second position.

References Cited

UNITED STATES PATENTS

| | | | |
|---|---|---|---|
| 140,517 | 7/1873 | Mayall | 215—53 |
| 576,530 | 2/1897 | Albrecht | 85—3 |
| 1,384,904 | 7/1921 | Lattimore | 292—257 |
| 2,318,548 | 5/1943 | Whitehead et al. | 85—3 |
| 2,661,970 | 12/1953 | Petersen | 85—3 |
| 2,733,629 | 2/1956 | Vogt. | |
| 3,093,220 | 6/1963 | Modrey | 215—53 |
| 3,360,155 | 12/1967 | Colonna | 292—258 |
| 3,361,465 | 1/1968 | Dobbs | 292—257 |

FOREIGN PATENTS

| | | |
|---|---|---|
| 1,387,763 | 12/1964 | France. |
| 780,499 | 8/1957 | Great Britain. |

MARION PARSONS, JR., *Primary Examiner.*